(12) United States Patent
Allen

(10) Patent No.: US 6,321,926 B1
(45) Date of Patent: Nov. 27, 2001

(54) METHOD FOR INCREASING GOLF COURSE REVENUES AND APPARATUS FOR SAME

(76) Inventor: Michael P. Allen, 9853 N. Grand Duke Cir., Tamarac, FL (US) 33321

( * ) Notice: Subject to any disclaimer, the term of this patent is extended or adjusted under 35 U.S.C. 154(b) by 0 days.

(21) Appl. No.: 09/468,384

(22) Filed: Dec. 20, 1999

(51) Int. Cl.[7] .................................................. B65D 21/02

(52) U.S. Cl. .................................. 220/23.87; 220/23.86; 220/4.26

(58) Field of Search .................................. 220/4.26, 4.27, 220/23.88, 23.87, 23.86, 23.83, 915.2, 915.1

(56) References Cited

U.S. PATENT DOCUMENTS

| D. 310,593 | 9/1990 | Lamarche . |
| D. 387,327 | 12/1997 | Ethridge . |
| 687,619 | * 11/1901 | Couse . |

(List continued on next page.)

FOREIGN PATENT DOCUMENTS

| 217167 | * 9/1961 | (AT) . |
| 9509 | * 4/1980 | (EP) . |
| 883887 | * 12/1961 | (GB) . |

*Primary Examiner*—Stephen Castellano
(74) *Attorney, Agent, or Firm*—Manuel R. Valcarcel, Esq.

(57) ABSTRACT

A method for increasing golf course revenues through increased sales of consumable items, comprising the steps of stocking a golf cart with a supply of consumable items prior to a golfer's use of said golf cart in a golf outing, taking inventory of said supply of consumable items contained in said golf cart at the end of said golf outing to determine what items were consumed by said golfer, charging said golfer for the cost of the consumable items consumed by said golfer during said golf outing, and restocking said golf cart with a supply of consumable items.

The present invention also relates to an apparatus for increasing golf course concession revenues through sales of consumable items, comprising: a base section having insulation means, an inner and outer surface, a substantially closed bottom end, an open top end, one or more slotted flanges disposed on said outer surface of said base section for fastening said apparatus to a golf cart, and an inwardly tapered ledge disposed horizontally on said inner surface of said base section near said base section's upper edge; a removable pull-out container configured to fit within said base section and rest on said inwardly tapered ledge of said base section; an upper section having an open bottom end, a vertical wall area having an inner and outer surface and an access opening disposed thereon for access to items stored in said pull-out container without having to disassemble said apparatus, a side door connected to said upper section's vertical wall area covering said access opening, and a bottom edge compatibly grooved to couple with and rest on said upper edge of said base section; a top lid configured to fit over said open top end of said upper section; and an upper tray disposed within said upper section near said upper section's upper edge.

The apparatus of the present invention is employed in the method of the present invention by being stocked full of appropriate consumable items by the golf course operator prior to each golf outing, being installed in the rear basket section of the typical golf cart to provide easy access for golfers to a supply of such items on demand, being inventoried by the golf course operator after completion of the golf outing to identify the items consumed by the golfer during his or her golf outing, charging the golfer for the costs of such consumed items (either separately or as part of the golfer's total bill), and restocking the apparatus with a full supply of consumable items after the golf outing is completed and the golf cart is returned to the golf course operator, so that the method can be repeated with the next golfer renting the particular golf cart.

10 Claims, 8 Drawing Sheets

U.S. PATENT DOCUMENTS

| | | | |
|---|---|---|---|
| 1,351,410 | * | 8/1920 | Bruning . |
| 3,751,845 | * | 8/1973 | Leeuwen . |
| 4,550,930 | | 11/1985 | Proffit . |
| 4,657,100 | | 4/1987 | Lewis . |
| 4,889,267 | | 12/1989 | Bolton . |
| 4,989,767 | | 2/1991 | Buschbom . |
| 5,409,154 | | 4/1995 | Blount . |
| 5,419,478 | | 5/1995 | Mauro et al. . |
| 5,423,426 | * | 6/1995 | Harper .................................. 206/545 |
| 5,423,445 | * | 6/1995 | Montanari et al. ............... 220/23.83 |
| 5,480,078 | | 1/1996 | Verrette et al. . |
| 5,620,125 | | 4/1997 | Duncan et al. . |
| 5,636,852 | | 6/1997 | Sistrunk et al. . |
| 5,752,634 | | 5/1998 | Kortman . |
| 6,050,663 | * | 4/2000 | Schoellmann ....................... 312/408 |

* cited by examiner

Process Flow for Method of Increasing Golf Course Revenues

METHOD FOR INCREASING GOLF COURSE REVENUES AND APPARATUS FOR SAME

BACKGROUND OF THE INVENTION

The present invention relates to a method for increasing revenues generated by golf course operators through on-course concession-type sales of food, beverages, golf equipment and accessories and other consumable items, and an apparatus used in carrying out said method.

Most golf courses have a fleet of golf carts that are available for renting by golfers, and many have golf "pro-shops" adjacent to the golf course which sell golfing accessories and equipment, and sometimes also canned or bottled beverages and packaged food items for golfers to purchase and take with them while golfing. Most golfers rent a golf cart when on a golf outing in order to travel the course. The golf course operator keeps a running bill to which are added the course usage charges, golf cart rental charges, and purchases of consumable items by the golfer. The bill is typically paid at the end of the golf outing with an initial deposit via credit card being placed by the golfer when signing-in.

Alternately, golfers who desire to have food, beverages, extra golf balls and other golf accessories while on a golf outing generally have to bring a supply of these items with them from sources other than the golf club's pro-shop. However, many golf courses discourage or even prohibit golfers from bringing such items from outside the golf course because allowing golfers to do so could lead to damage of golf carts and the golf course because of the various containers used by golfers for these items. Additionally, this would deprive golf course operators of revenues generated from the sales of such items.

The ability of golf course operators to generate revenues from sales of such beverages, packaged foods and other consumable items through pre-golf outing sales at their pro-shop is limited by what golfers can carry with them on the golf outing. Most golf course operators do not provide an effective means for carrying and storing such items in their rentable golf carts.

The typical golf cart has very little storage space. Although many golf carts have trays molded into their frames, the trays are fairly small in size and do not provide for secure and stable storage of items. Typical golf carts also have can or bottle carriers molded into their frames and dimensioned to fit the exterior dimensions of a typical soda can or soda bottle. However, only one such can carrier is typically provided for each passenger. The typical golf cart also has a basket mounted behind the passenger seat. While such baskets are large enough, typically, to hold a cooler, most golf carts are not equipped with such a container, which means that the golfer, if permitted by the golf course, must bring his or her own container, typically a conventional cooler or bag. The typical cooler or bag is not adequate to provide stable and secure storage of dry consumable goods and golf accessories together with canned or bottled beverages.

All of these limitations, left unaddressed, result in a lost opportunity to generate revenues from sales of consumable items. Golf course operators are generally aware of the storage limitations of golf carts and the needs of golfers for various consumable items during a golf outing. Current efforts to address these needs and generate revenues from consumable items involve the employment of a golf course attendant that acts as a waiter/waitress traveling the golf course and taking orders for concession-type items from golfers. This approach has its limitations as well.

Because the attendant is traveling the course, golfers have to wait until the attendant reaches them to place an order for such items. The wait can be long, and as a result golfers often do not have the food, beverages and other consumable items they want or need. If a supply of these items was provided for them in their golf carts, golfers would be able to have such items whenever they want. This would likely improve golfers' performance as they would be able to maintain hydration in hot temperatures and have the necessary nutrients to maintain optimum energy levels while playing. They would also have access to golf accessories, such as gloves, tees, extra balls and other items when the need arises. They would likely consume more of these items and as a result, golf course operators would generate greater revenues from sales of these items than they presently do using a traveling golf course attendant.

The prior art includes a few containers or mounting means for containers intended for use in golf carts to carry beverages, food and other consumable items. For example, U.S. Pat. No. 5,620,125 to Duncan, et al. discloses a bumper attachable accessory support device, and U.S. Pat. No. 5,409,154 discloses a support device for coolers removably attachable to golf carts. These inventions are merely brackets to hold conventional insulated coolers.

Still other prior art efforts have focused on providing a container for carrying refreshments in a golf cart through conventional coolers configured to fit in an area of a golf cart that will not occupy space that is needed for other purposes. For example, U.S. Pat. No. 4,989,767 to Buchsbom discloses a golf cart cooler releaseably mountable on the front end of a motorized golf cart, and U.S. Pat. No. 5,419,478 to Mauro, et al. discloses a steering column mounted cooler.

These inventions are space saving configurations of conventional coolers for food items. They do not address the need to store dry goods and various golf accessories in addition to food and beverages in a secure and insulated container. Additionally, the prior art does not address the need for convenience in having an apparatus containing such items already installed and fully stocked when a golf cart is rented for a golf outing, nor does it teach a method for golf course operators to increase revenues generated from sales by them of consumable items through use of a new and useful apparatus capable of meeting these long-felt needs.

SUMMARY OF THE INVENTION

The present invention's method, through its use of a new and useful apparatus, eliminates the need for golf course operators to employ a golf course attendant to serve as a waiter/waitress traveling the golf course to take and fill orders from golfers for food, beverages and other consumable items by providing an apparatus that is mountable on golf carts to carry such items in a secure and climate-controlled manner. Persons utilizing the golf course thus carry with them in their rented golf carts an ample and easily accessible supply of such items and do not have to search or wait for a traveling golf course attendant to provide such items. The golf course operator thereby resolves the limitations problems of being able to sell of only so much of such items as can be carried by the golfer from the golf club's pro-shop, and separates the payment from the purchase; separating the payment from the purchase increases sales of products or services because it makes the purchaser feel less limited or resistant to making a purchase-the purchase can be paid for later, as part of a total bill, payment of which is oftentimes further deferred via credit card.

The apparatus forming part of the present invention includes compartments for holding dry consumable items such as cigars, packaged foods, golf balls, gloves, tees, and other golf equipment and accessories typically consumed in a golf outing, as well as insulated compartments for holding food items intended to be maintained cool or warm, including an insulated compartment for holding liquids such as ice and cold beverages. The apparatus optionally includes one or more removable trays for storing dry food items in a climate controlled compartment separate from both liquids and golf accessories and other dry non-food items. Access to the various compartments is provided by lids and doors that can be conveniently accessed. The apparatus also has separate upper and lower portions that can be easily separated for additional access such as for cleaning and restocking purposes. The apparatus' components are configured through the use of complementarily tapered edges and/or tongued and grooved edges to fit together securely and snugly. This combination of compartmentalization and component configuration provides for stable and secure storage of consumable items that would typically not be stored within the same compartment because of their different characteristics. The apparatus is designed to contain within its structure, and to collect in the interior surface of its base section, any spills of liquid contents, and has a drain for draining such spilled liquids. The dimensions of the apparatus are such that the apparatus fits snugly in the rear basket section of the standard-sized golf cart, and can be affixed to the golf cart.

The apparatus of the present invention is employed in the method of the present invention by being stocked full of appropriate consumable items by the golf course operator prior to each wolf outing, being installed in the rear basket section of the typical golf cart to provide easy access for golfers to a supply of such items on demand, being inventoried by the golf course operator after completion of the golf outing to identify the items consumed by the golfer during his or her golf outing, charging the golfer for the costs of such consumed items (either separately or as part of the golfer's total bill), and restocking the apparatus with a full supply of consumable items after the golf outing is completed and the golf cart is returned to the golf course operator, so that the method can be repeated with the next golfer renting the particular golf cart.

With the provision of an ample and easily accessible supply of consumable items, golfers will consume more of such items during the typical golf outing than under current methods where consumption is limited to before or after the golf outing, in the limited instances where a traveling golf course waiter/waitress is encountered on the course, or only to the extent that a golfer can bring such items with him or her using his or her own storage means. This increase in sales of consumable items coupled with the elimination of the need to dedicate employees to act as traveling waiters/waitresses increases golf course revenues. Additionally, the present invention enables golfers, particularly when golfing in extreme weather conditions, to maintain their physical performance level by providing the needed liquids, food and golf accessories.

These together with other advantages of the present invention will become apparent in the detailed description of the invention that follows as well as through the drawings forming part hereof.

DESCRIPTION OF THE PREFERRED EMBODIMENTS

Figure 2:
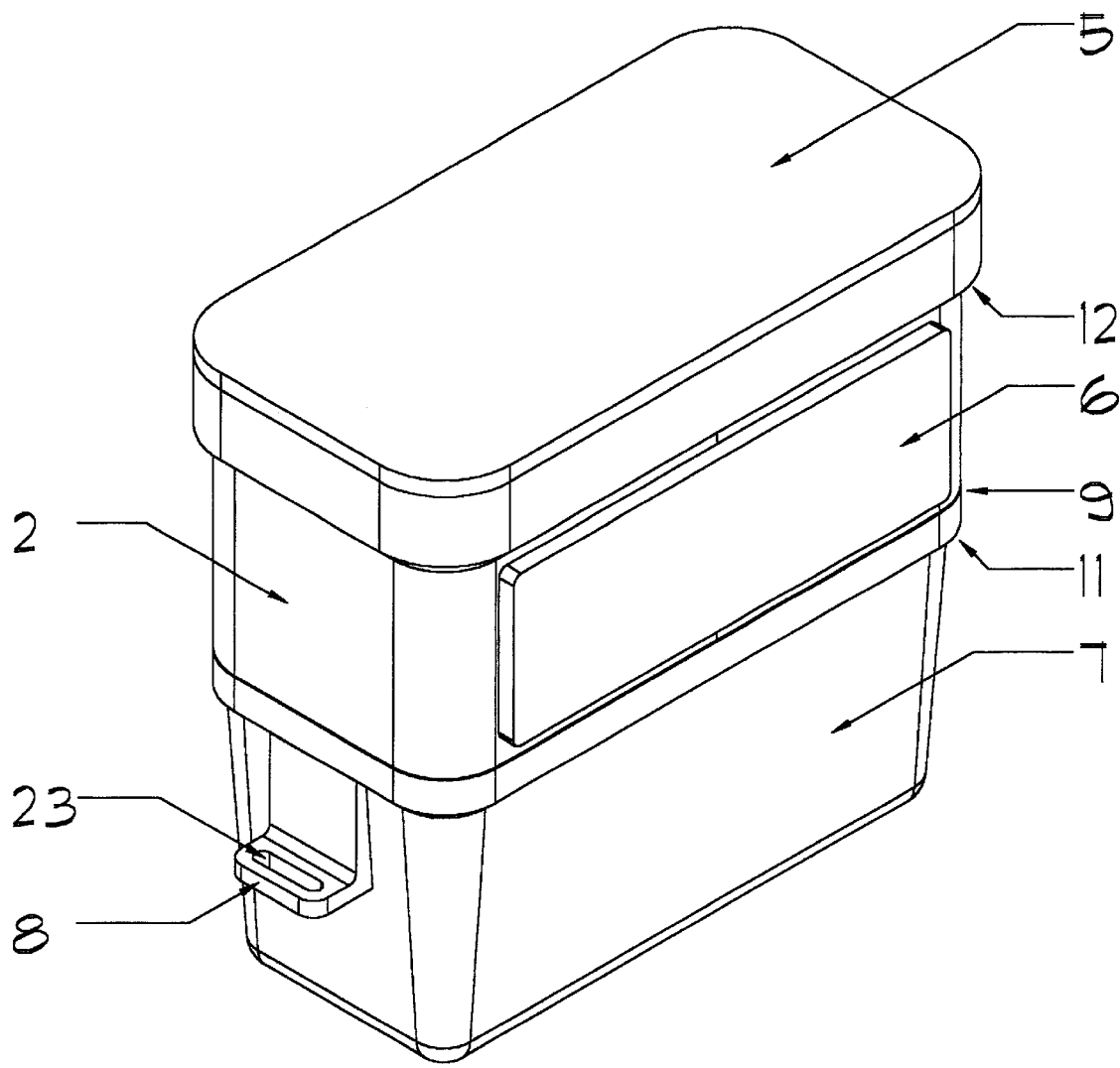
FIG. 2 is a perspective view of the apparatus showing the front with the side door of the upper storage section and the top lid in the closed position, and one sidewall showing the flange for securing the apparatus to the typical golf cart.
Figure 5:
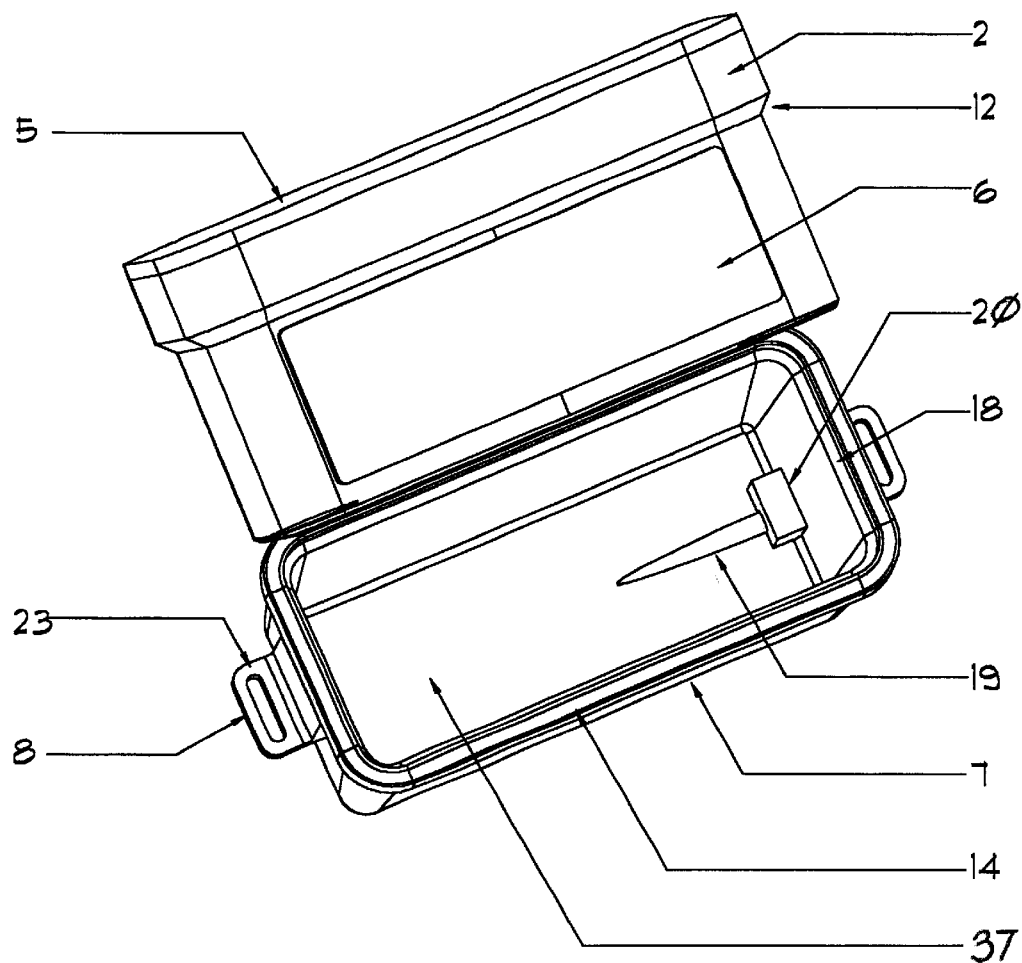
FIG. 5 is a top view of the apparatus with the base section separated from the upper section showing the bottom inner surface of the base section.

Referring now to the drawings, FIG. 2 depicts the apparatus of the present invention, which generally comprises a base section 7 and an upper section 2 removably coupled to said base section. As depicted in FIG. 5, the base section 7 has an open top end and a substantially closed bottom end and, as further depicted in FIG. 7, has an inner wall 32 and an outer wall 33 providing insulation for contents placed within it. The insulation can be in the form of foam or other insulating material, including possibly even gas such as air disposed in the cavity 34 between the inner wall 32 and outer wall 33 of said base section 7. The base section 7 can optionally include one or more slotted flanges 8 on one or more of its sides for fastening the apparatus to the golf cart itself or to the rear basket typically present in a golf cart. Fastening can be accomplished by use of ties, belts, clamps, bolts, or other known fastening means to fasten said flanges 8 to the golf cart.

Figure 4:
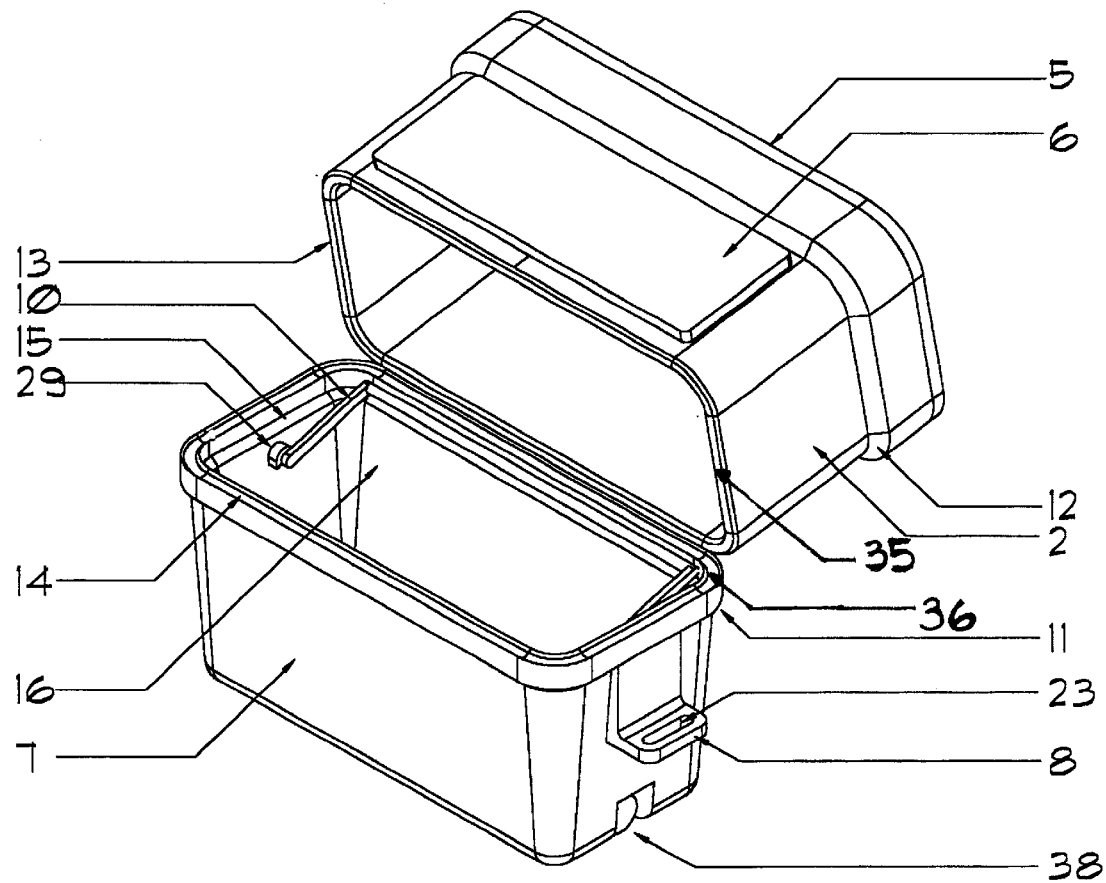
FIG. 4 is a perspective view of the apparatus showing the base section separated from the upper section and the pull-out container with handle resting within the base section on the inward taper along the inner circumference of the base section near said base section's upper edge.
Figure 7:
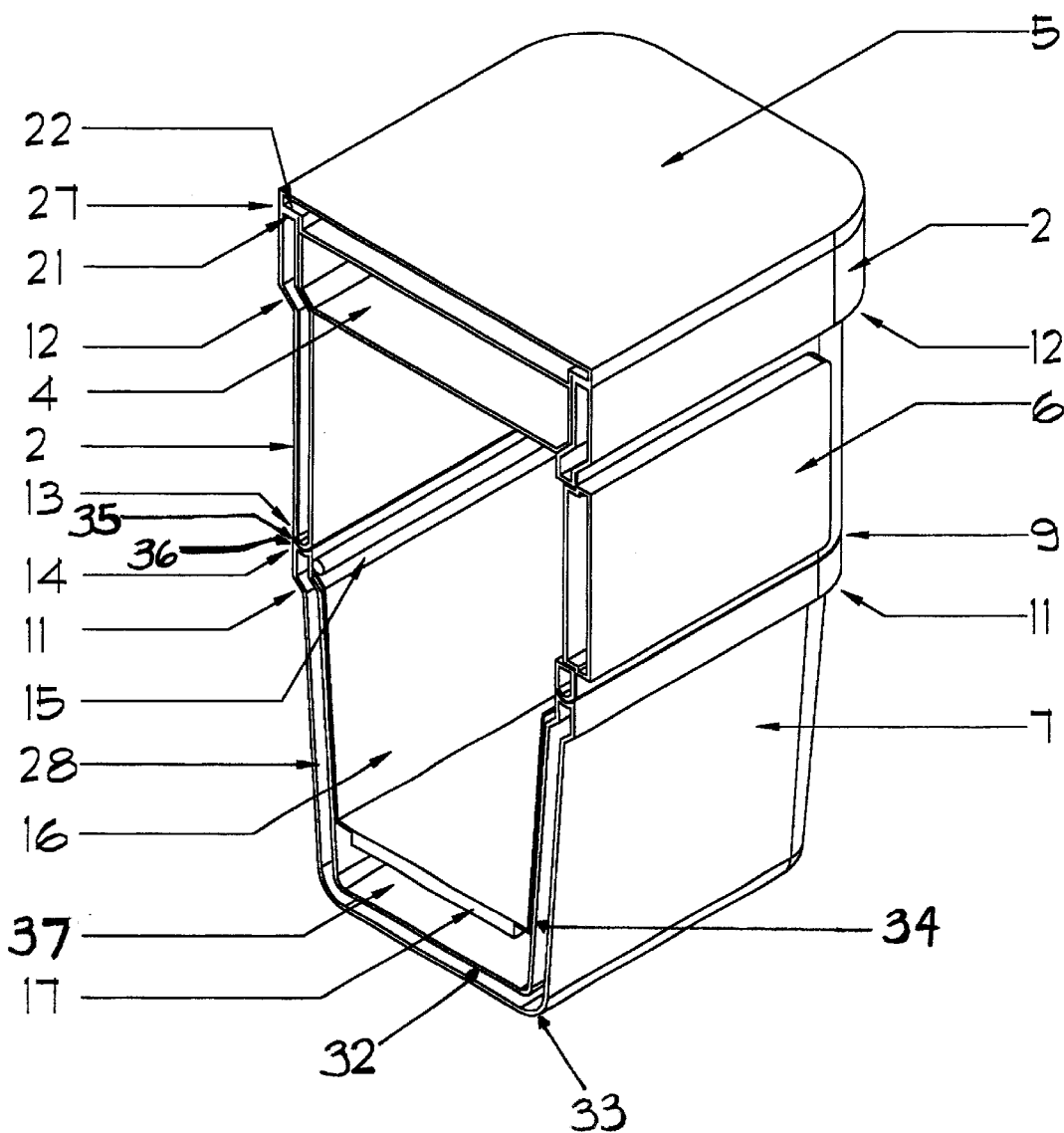
FIG. 7 is a fragmentary cross-sectional view of the apparatus showing how the base portion, the upper section, the side door and upper lid are fitted together.
Figure 8:
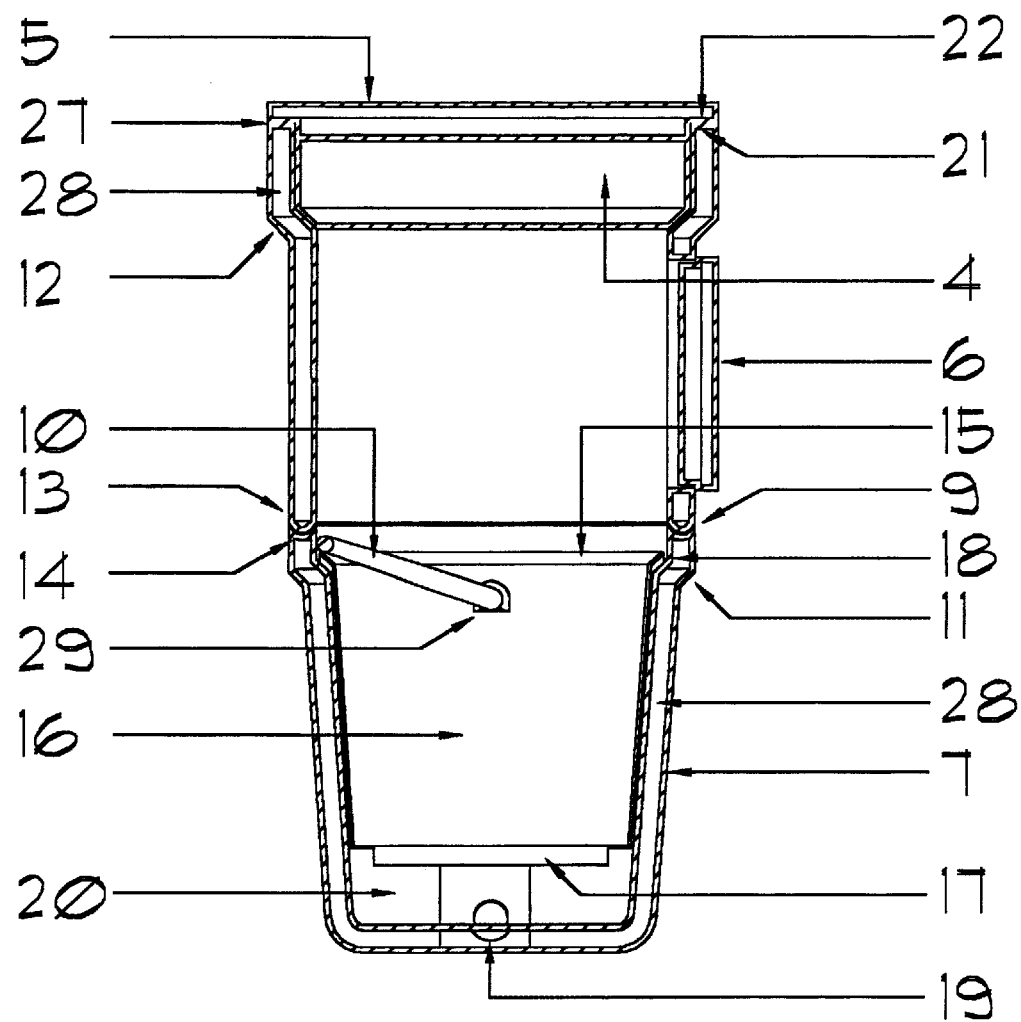
FIG. 8 is a side view of the apparatus showing how the various parts of the apparatus fit together.

As depicted in FIG. 4, the upper edge 14 of the base section 7 and the lower edge 13 of the upper section 2 are compatibly fitted, either, as depicted in FIG. 7, with a tongue 35 and groove 36 connection, or with other compatible connections such as overlapping indentations as used in the typical plastic container and snap-on lid configuration. The inner wall 32 of the base section 7 has an inwardly tapered ledge 18 near its upper edge 14; this inwardly tapered ledge 18 serves to direct any upward liquid splashes from contents placed within the base section 7 back down into the base section 7. The bottom inner surface 37 of the base section 7 has a channel 19 ending in a reservoir 20 which serves to collect liquids and direct drainage of such liquids through a drain hole 38 disposed one side of the base section 7.

Figure 3:
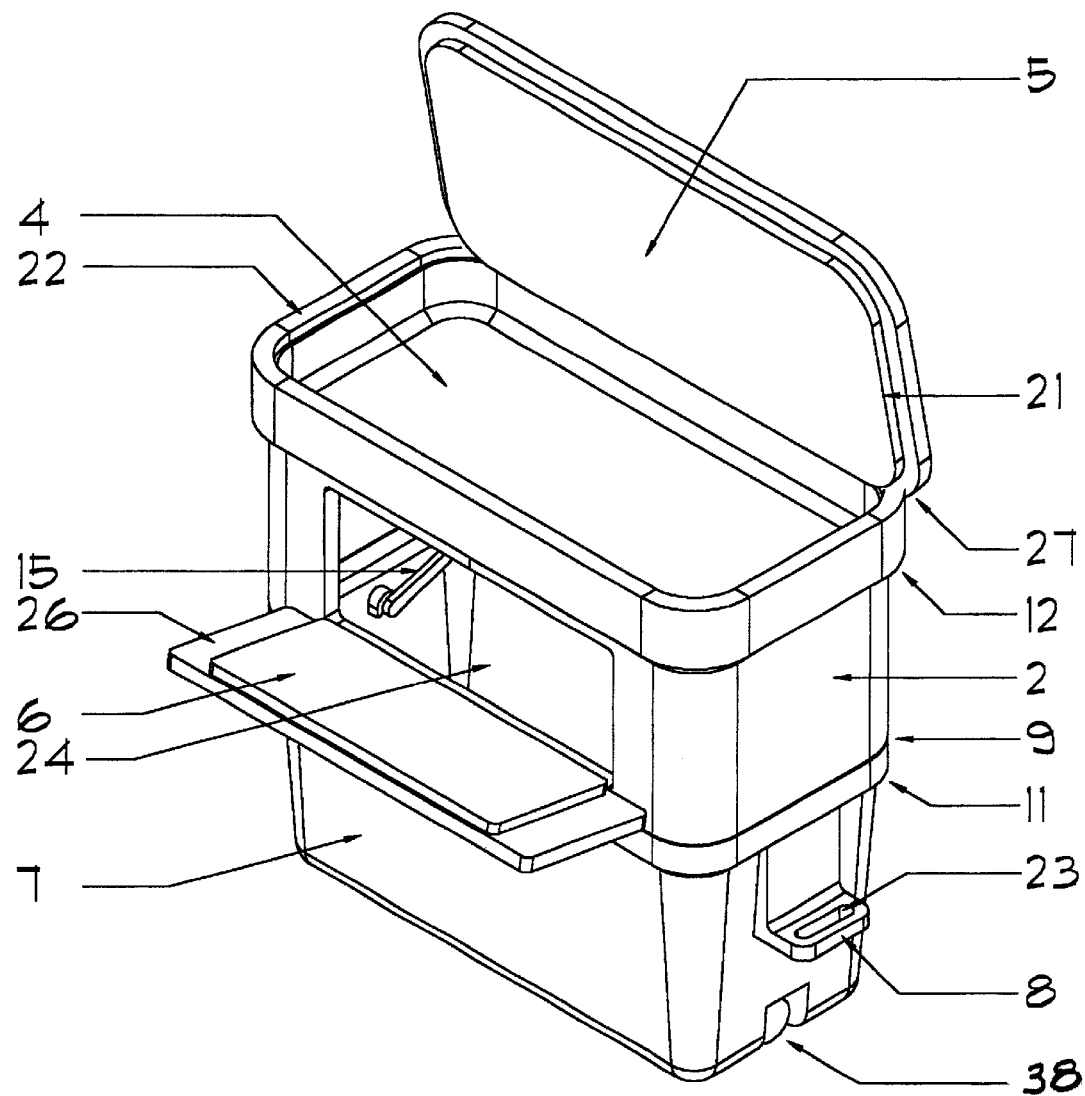
FIG. 3 is a perspective view of the apparatus showing the front with the side door of the upper section in the open position as well as the pull-out container contained within the base section and accessible through the side door of the upper section, and the top lid in the open position, with the removable dry goods tray resting within the upper section on the indentation along the inner circumference near the upper edge of the upper section.

As depicted in FIG. 4, the upper section 2 has an open bottom end, where it fits compatibly with the upper edge 14 of the base section 7. The upper section 2 includes a side door 6 disposed on one of its sides. As noted in FIG. 3, the side door 6 covers an opening 24 in said upper section 2 through which the contents of the apparatus can be easily accessed. The connection of said side door 6 to said upper section 2 can be by a hinge mechanism, optionally a spring hinge mechanism so that said side door automatically closes to minimize temperature changes in the insulated compartment of said base section 7. Alternately, the side door 6 can be connected to the upper section 2 by use of a male-female socket and appendage connection on opposite sides of said side door 6. The side door and upper section can optionally be fitted with magnets near their respective edges that when coupled by closing the side door maintain the side door connected to the upper sections. The upper section 2 also includes an top lid 5 that covers the opening 40 at the upper end 22 of the upper section 2. The top lid 5 can be connected to the upper section 2 by use of a hinge 27, optionally a spring hinge mechanism so that the top lid 5 automatically closes. Alternately, the top lid 5 can be compatibly fitted with the upper edge 22 of the upper section 2 by having an indented ridged underside 21 that is compatible with an indented upper edge 22 of the upper section 2 so that the top lid 5 interlocks with the upper edge 22 of the upper section 2.

Figure 6:
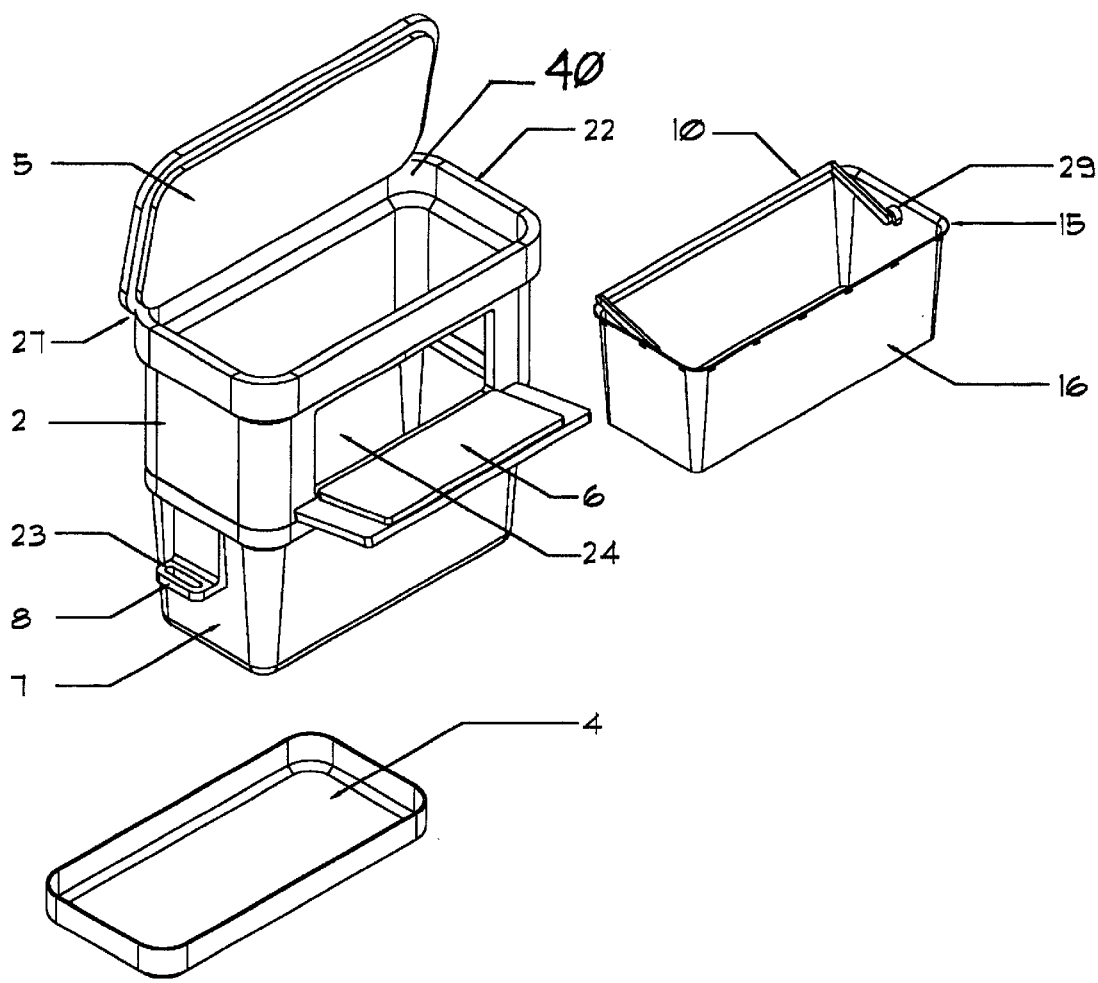
FIG. 6 is a perspective view of the apparatus showing its components, including the pull-out container showing its handle and outwardly tapered edge, as well as the upper tray.

The apparatus achieves secure compartmentalization capable of stably storing both liquid and dry food and beverage items in an insulated environment as well as other dry goods and golf accessories through the use of a pull-out container 16 that is configured to fit snugly within the base section 7 and rest on the inwardly tapered ledge 18 near the top end of the base section 7. Referring to FIG. 6, the pull-out container has an outwardly tapered upper edge 15 designed to rest on the inwardly tapered ledge 18 to support said pull-out container when it is placed within the base section 7. The pull-out container 16 is accessible by opening the side door 6 and optionally includes a handle 10 for lifting said pull-out container 16 out of the base section 7 for stocking with ice and beverages and for removal for cleaning of the inner bottom surface of the base section 7. The pull-out container has a recessed bottom platform 17 that serves to leave space The pull-out container 16 can be used to hold non-liquid food items desired to be kept in an insulated environment.

An upper tray 4 configured to fit within said upper section, which can be used to contain dry goods and golf accessories, is removably insertable within the upper section 2 and rests on the ledge 12 formed by the inward indentation along the circumference of the inner surface of the upper section 2 near its upper edge 22. The dimensions of the upper tray 4 are such that it fits snugly within the interior of the upper section 2. The upper tray 4 can either have a handle like the lower tray, or can have one or more notches or grooves 25 on one or more of its sides so that a finger can be inserted to lift the upper tray 4 out of its resting point.

The inner and outer walls of the apparatus are of sufficient thickness to maintain strength and to allow for insulation between said walls. The upper section can be insulated like the base section, or can be uninsulated with solid construction rather than inner and outer walled construction with a cavity disposed therebetween. Insulation may be simple air in the space or can be various other types of insulation available. The walls themselves are comprised of any plastic, fiberglass or other rigid material sufficient to withstand the expected heavy use. The inner walls or surfaces need not be planar with their matching outer walls or surfaces, and the inner walls can be formed at a different angle than the exterior wall to create a more sturdy bottom.

Manufacture of the apparatus can be done using fiberglass built up and molded around a model having the shape of the inside surface, or with plastic using many of the plastic manufacturing processes available, including injection or vacuum molding.

The invention shown is adaptable to most golf carts and course carts, i.e., those being the two-passenger types of carts run by electric motor or by gasoline or other fuel; however, the apparatus of the present invention may be adapted easily for any nonhighway moving vehicle used for work or pleasure having characteristics of the golf cart as described.

Figure 1:
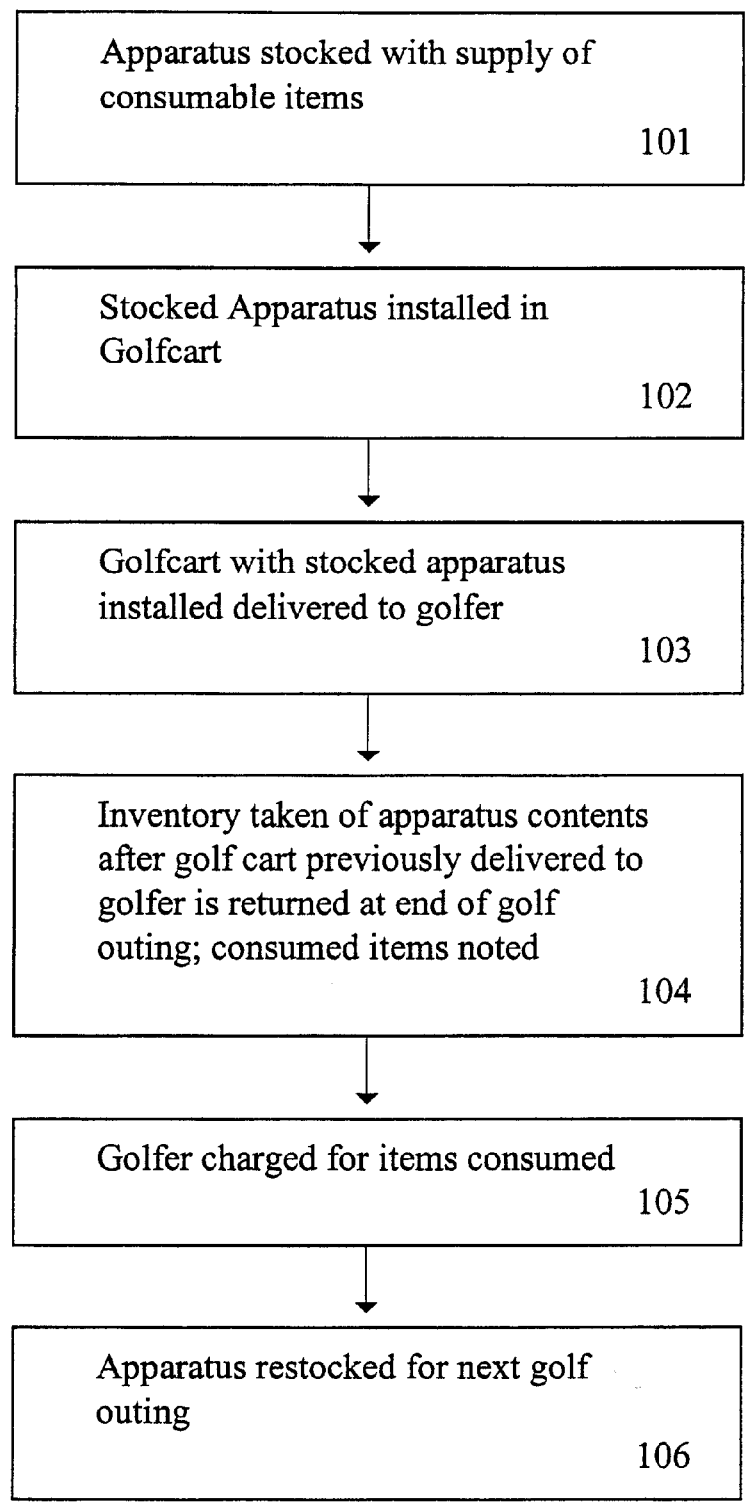
FIG. 1 sets forth the process flow of the preferred embodiment of the method of the present invention.

FIG. 1 describes the process flow of the method of the present invention which employs the apparatus depicted in its preferred embodiment in FIGS. 2–8: The golf course operator using the method of the present invention would, before a golfer begins using the golf cart in his or her golf outing, stock the apparatus with appropriate consumable items in the proper compartments for same within said apparatus 101: ice and canned or bottled beverages in the base section of the apparatus, dry food items such as prepackaged foods that are desired to be kept in an insulated environment within the pull-out container that is removably insertable and rests on the ledge formed around the inner surface of said base section near its upper edge, and dry goods such as cigars and golf accessories within the removable dry goods tray that when inserted into the apparatus rests within the upper section of said apparatus on the ledge formed around the inner surface of said upper section near its upper edge.

The apparatus can be stocked either before or after placing the apparatus in the golf cart 102. Once the apparatus is stocked with consumable items and placed within the golf cart, the golf course attendant need do nothing further until the golfer completes his or her golf outing and returns the golf cart. The golfer is delivered a golf cart with the stocked apparatus installed 103. The golfer will have an ample supply of consumable items at his or her disposal throughout the golf outing, and all items consumed are sold by the golf course operator, resulting in revenues to the operator. Additionally, the golf course operator maintains control over the type of container used in its golf carts, thereby reducing the possibility of damage to the golf cart.

Once the golf outing is completed and the golf cart is returned, the golf course operator takes an inventory of the apparatus' contents, noting what has been consumed by the golfer 104. A tally is prepared of the items consumed and the per item cost and the bill is computed and added to the golfer's total bill for the entire outing 105. Alternately, the golfer can be charged separately for the items consumed. The golf course operator can clean the apparatus, drain any spilled liquids or melted ice, and replace or restock its contents prior to renting the golf cart to the next golfer 106. The cleaning and restocking can be done either with the apparatus still placed within the golf cart or after removing the apparatus from the golf cart and either before, simultaneously with or after the inventory is taken and the golfer's bill is computed.

While there have been shown and described particular embodiments of the invention, it will be obvious to those skilled in the art that changes and modifications may be made without departing from the spirit and scope of the present invention or its equivalents, and, therefore, it is intended by the appended claims to cover all such changes and modifications as fall within the true spirit and scope of the invention.

Have thus described the invention, what is claimed is:

1. An apparatus for increasing golf course concession revenues through sales consumable items, comprising:

a base section having insulation means, an inner and outer surface, a substantially closed bottom end, an open top end, and an inwardly tapered ledge disposed horizontally on said inner surface of said base section near said base section's upper edge;

a removable pull-out container configured to fit within said base section and rest on said inwardly tapered ledge of said base section;

an upper section having an open bottom end, a vertical wall area having an inner and outer surface and an access opening disposed thereon for access to items stored in said pull-out container without having to disassemble said apparatus, a side door connected to said upper section's vertical wall area covering said access opening, and a bottom edge configured to couple with and rest on said upper edge of said base section; and a top lid configured to fit over said open top end of said upper section.

2. The apparatus of claim 1 further comprising one or more slotted flanges disposed on said outer surface of said base section for fastening said apparatus to a golf cart.

3. The apparatus of claim 1 further comprising an upper tray disposed within said upper section near said upper section's upper edge.

4. The apparatus of claim 3 wherein said upper tray is removable from within said upper section of said apparatus.

5. The apparatus of claim 1 wherein said substantially closed bottom end of said base section further comprises a drain channel disposed on its inner surface leading to a drain reservoir, a drain hole disposed through said inner and outer surfaces of said base section adjacent to said drain reservoir, and a drain hole cover removably attachable to said drain hole.

6. The apparatus of claim 1 wherein said pull-out container further comprises a pivotally connected handle.

7. The apparatus of claim 2 wherein said upper section has a ledge disposed horizontally on said inner surface of said vertical wall area.

8. The apparatus of claim 3 wherein said upper section has a ledge disposed horizontally on said inner surface of said vertical wall area, and wherein said upper tray rests on said ledge of said upper section when inserted into said upper section.

9. The apparatus of claim 4 wherein said upper section has a ledge disposed horizontally on said inner surface of said vertical wall area, and wherein said upper tray rests on said ledge of said upper section when inserted into said upper section.

10. An apparatus for increasing golf course concession revenues through sales of consumable items, comprising:

a base section having a substantially closed bottom end and an open top end;

a removable pull-out container configured to fit within said base section;

an upper section having a substantially open bottom end and a substantially open top end, a vertical wall area having an inner and outer surface and an access opening disposed thereon for access to items stored in said pull-out container without having to disassemble said apparatus, said upper section removably coupled to said base section;

a top lid configured to cover said substantially open top end of said upper section; and an upper tray configured to fit within said upper section.

* * * * *